UNITED STATES PATENT OFFICE.

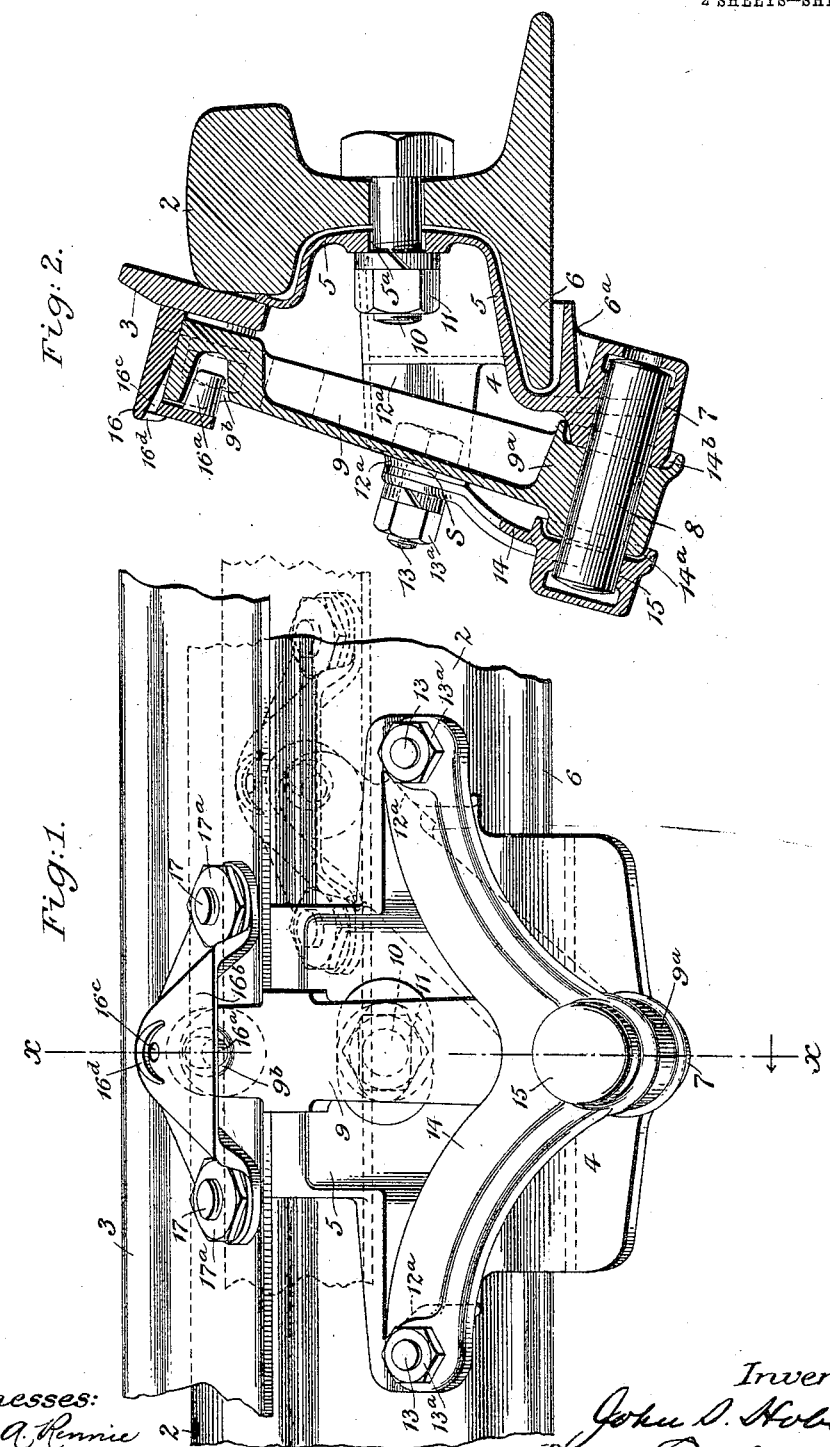

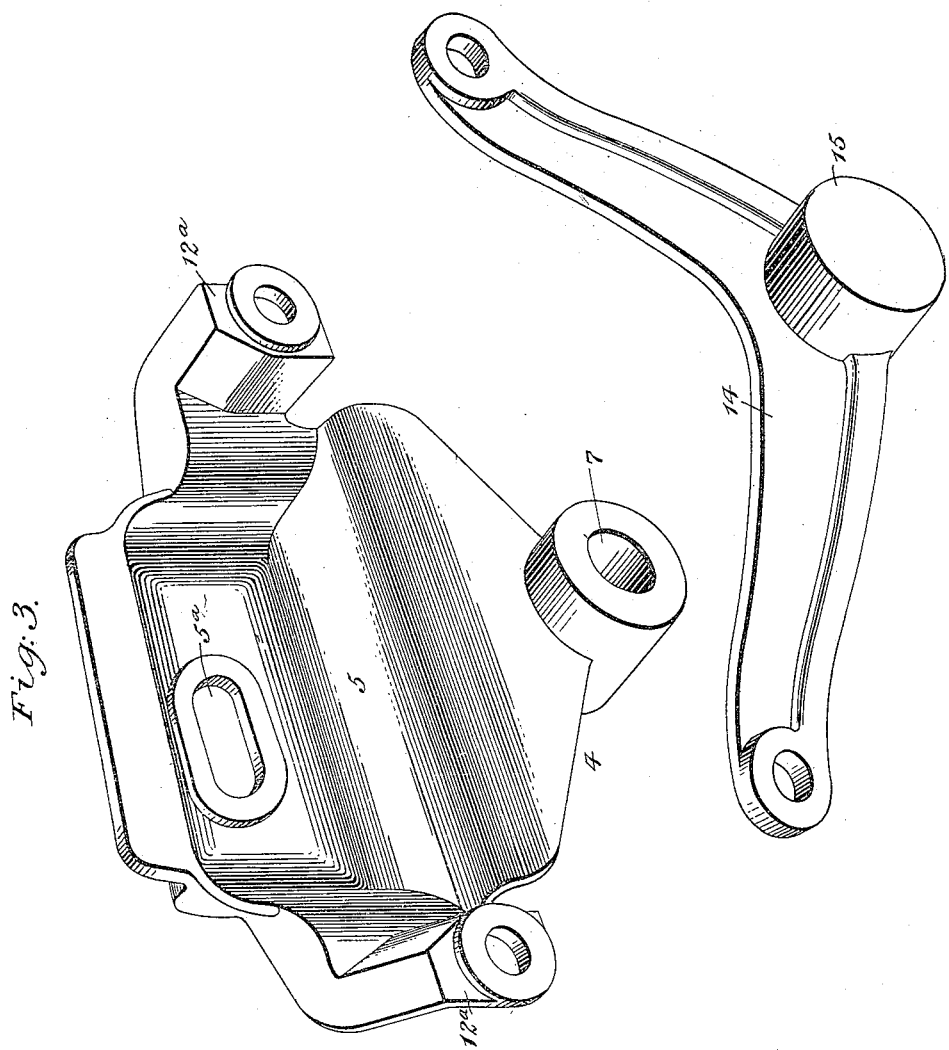

JOHN S. HOBSON, OF EDGEWOOD PARK, PENNSYLVANIA, ASSIGNOR TO THE UNION SWITCH AND SIGNAL COMPANY, OF SWISSVALE, PENNSYLVANIA, A CORPORATION OF PENNSYLVANIA.

CLIP FOR DETECTOR-BARS.

No. 816,658.     Specification of Letters Patent.     Patented April 3, 1906.

Application filed January 10, 1906. Serial No. 295,340.

*To all whom it may concern:*

Be it known that I, JOHN S. HOBSON, a citizen of the United States, residing at Edgewood Park, in the county of Allegheny and State of Pennsylvania, have invented certain new and useful Improvements in Clips for Detector-Bars, of which the following is a specification.

My invention relates to clips or supports which are employed to support detector-bars alongside a railway-rail.

I will describe a clip or support embodying my invention and then point out the novel features thereof in claims.

In the accompanying drawings, Figure 1 represents in side elevation a portion of a track-rail, a clip or support embodying my invention, and a portion of a detector-bar supported in the clip. In this view the detector-bar is shown moved to its highest position in full lines and is represented by dotted lines in its lowest position. Fig. 2 is a vertical transverse section taken on the line $x\ x$ of Fig. 1. Fig. 3 is a perspective view of a clip or support embodying my invention.

Similar reference characters designate corresponding parts in the figures of the drawings.

2 designates a portion of a railway-rail, 3 a portion of a detector-bar, and 4 a clip or support. It will be understood that a plurality of clips or supports 4 are employed to hold the detector-bar in position alongside the railway-rail.

The clip 4 (see Fig. 3) comprises two parts, one a bracket, which is secured to the railway-rail, and the other a yoke or support for one end of a pin or stud 8, which forms a pivot for a link 9, to be hereinafter referred to. As shown, the bracket part of the clip comprises a portion 5 of a contour substantially that of one side of the railway-rail and terminating in a bearing 7 to receive one end of the pin or stud 8. It is also provided with a flange $6^a$, which, in connection with the portion 5, forms a recess to receive a part of the flange or base 6 of the railway-rail 2, and with outwardly-projecting portions $12^a$, to which the ends of a support 14 are secured.
The bracket is shown as being secured to the web of the rail by means of a bolt 10 passing through an opening in the web of the rail, and an opening $5^a$ in the bracket and a nut 11.

Any other fastening means may be employed. These are well known in the art and need not be described.

The yoke or support 14 is shown as being provided with a bearing 15 for one end (the outer end) of the pin 8 and is secured at its ends by bolts 13 and nuts $13^a$ to the bracket, preferably at the projecting portions $12^a$. The bearing 15 is formed with a cylindrical recess $14^a$ to receive one end of a hub $9^a$ of the link 9.

9 designates the link, and it is formed with a hub or boss $9^a$, which is bored to fit on the pin or stud 8. The outer portion of the hub or boss projects into the cylindrical recess $14^a$, formed in the bearing 15 of the yoke 14. The opposite end of the hub or boss is formed with a cylindrical recess $14^b$ to receive the adjacent end of the bearing 7. This arrangement of the recesses to receive the adjacent parts is to prevent particles of sand or other gritty substances from reaching the pin or stud 8 or its bearings, and thus obviate wear of the pin or stud and its bearings due to this cause. The upper end of the link 9 is provided with an opening $9^b$, into which a pin or lug $16^a$ fits. The pin or lug $16^a$ is carried by a hood 16, which is secured to the detector-bar by means of bolts and nuts 17 $17^a$. Instead of bolts and nuts rivets may be employed. The hood 16 may be cast and the casting provided with suitable perforations at each end to receive the fastening bolts or rivets. The pin or lug $16^a$ is shown as being integral with the plate; but it may be inserted therein, as may be found desirable. At or near the upper extremity of the raised central portion $16^b$ of the hood 16 I provide an oil-hole $16^c$, which leads to the interior of the housing, and so provide means for lubricating the parts working therein. Over the oil-opening I have arranged an outwardly-projecting convexed flange $16^d$ in order that sand, dirt, or other substances may be deflected away from such opening, and thereby prevented from contacting with the pivotal connections at that point. This form of connection avoids the disadvantages incident to the stud commonly employed at this point, the principal one of which is that it became loose after a short use, as it was riveted in the detector-bar. As shown, the hood 16 of this invention is bolted or riveted to the detector-bar at two points, thereby increasing the strength of the connection between the hood 16 and the detector-bar.

It will be seen that the detector-bar will always be held in position against the rail by reason of the rigid support for the outer end of the pin or stud 8 being supported in the yoke 14, which is secured at its ends to the bracket. The movement of the link 9 is limited in its to-and-fro movements by engaging the projections 12ª.

By referring to Fig. 2 it will be seen that quite a space (represented at $s$) is left between the yoke 14 and link 9, their relative positions being such that the link is free to move back and forth without touching it or meeting with any other obstruction. Therefore whatever natural friction may arise during the operation of my invention will be wholly confined to the pivotal points.

What I claim as my invention is—

1. The combination in a detector-bar support of a bracket portion having a bearing, a yoke portion also having a bearing and secured to the bracket, a pin journaled in said bearings and a link movable on said pin.

2. The combination of a link suitably pivoted at one end in a support, a detector-bar, and a connection between the link and detector-bar, comprising a plate carried by the detector-bar and provided with a pin which fits in an opening in the link.

3. The combination of a link suitably pivoted at one end in a support, a detector-bar, and a connection between said link and detector-bar comprising a hood fastened to the detector-bar to receive the adjacent end of the link and carrying a pin or stud which fits in an opening in the link.

4. The combination in a detector-bar support, of a bracket portion, having a bearing and outwardly-extending projections, a yoke portion also having a bearing and secured to the projecting portions of the bracket, a pin journaled at its ends in said bearings and a link pivoted on the pin intermediate the bearings.

5. The combination in a detector-bar support, of a bracket portion having a bearing, a yoke portion also having a bearing and secured to the bracket, a pin journaled at its ends in said bearings and a link pivoted on said pin intermediate the bearings.

6. The combination in a detector-bar support, of a bracket portion having a bearing, a yoke portion also having a bearing and a cylindrical recess and secured to the bracket, a pin journaled in said bearings, and a link provided with a hub pivoted on said pin intermediate the bearings, said hub at one side fitting in the cylindrical recess in the yoke and having a cylindrical recess which receives the adjacent portion of the bearing of the bracket.

In testimony whereof I have signed my name to this specification in the presence of two subscribed witnesses.

JOHN S. HOBSON.

Witnesses:
    JAMES CHALMERS, Jr.,
    F. L. WALTON.